United States Patent [19]

Lawson

[11] Patent Number: 4,942,093

[45] Date of Patent: Jul. 17, 1990

[54] ADHESIVE SYSTEM FOR BONDING UNCURED RUBBER TO CURED POLYURETHANE

[75] Inventor: David F. Lawson, Uniontown, Ohio

[73] Assignee: Bridgestone/Firestone, Inc., Akron, Ohio

[21] Appl. No.: 242,392

[22] Filed: Sep. 9, 1988

[51] Int. Cl.$^5$ .................. B32B 27/40; C08F 8/30; C08G 18/28

[52] U.S. Cl. .................. 428/423.3; 428/424.7; 428/423.9; 428/473.5; 525/126; 528/73

[58] Field of Search ............... 428/473.5, 423.3, 424.7, 428/423.9; 525/126; 528/73

[56] References Cited

U.S. PATENT DOCUMENTS

| | | | |
|---|---|---|---|
| 2,702,773 | 2/1955 | Penn et al. | 528/73 |
| 2,837,458 | 6/1958 | Coleman, Jr. | 154/139 |
| 3,264,249 | 8/1966 | Araki et al. | 260/32.4 |
| 3,264,269 | 8/1966 | Rees et al. | 260/77.5 |
| 3,528,848 | 9/1970 | Zoebelein et al. | 117/138.8 |
| 3,595,826 | 7/1971 | Conard | 260/33.6 |
| 3,645,980 | 2/1972 | Baker et al. | 260/77.5 CR |
| 3,648,748 | 3/1972 | Lovell | 152/353 |
| 3,817,918 | 6/1974 | Aufdermarsh, Jr. | 260/47 |
| 3,832,274 | 8/1974 | Owston | 161/183 |
| 3,832,275 | 8/1974 | Matvey et al. | 161/190 |
| 3,882,089 | 5/1975 | Baker et al. | 260/77.5 CR |
| 3,916,072 | 10/1975 | Hausch et al. | 428/423 |
| 3,917,554 | 11/1975 | Inoue et al. | 260/30.4 A |
| 3,991,255 | 11/1976 | Blaskiewicz et al. | 428/425 |
| 4,136,219 | 1/1979 | Odam | 427/385 B |
| 4,311,181 | 1/1982 | Hausch | 428/423.5 |
| 4,520,145 | 5/1985 | Stenzenberger | 523/500 |
| 4,535,121 | 8/1985 | Ozelli et al. | 524/715 |
| 4,581,425 | 4/1986 | Hefner, Jr. | 526/72 |
| 4,587,281 | 5/1986 | Stenzenberger | 523/500 |

FOREIGN PATENT DOCUMENTS

| | | |
|---|---|---|
| 8400552 | 2/1984 | Int'l Pat. Institute . |
| 136363 | 3/1980 | Japan . |
| 0083031 | 11/1981 | Japan . |
| 0083032 | 11/1981 | Japan . |
| 0085941 | 10/1983 | Japan . |
| 0179251 | 2/1984 | Japan . |
| 0227388 | 10/1984 | Japan . |
| 0648593 | 6/1976 | Sweden . |

Primary Examiner—Marion C. McCamish
Assistant Examiner—Elizabeth M. Cole
Attorney, Agent, or Firm—Daniel N. Hall

[57] ABSTRACT

A thermosetting adhesive comprising a bismaleimide compound and an isocyanate-terminated rubber polymer adapted to coreact upon heating is applied to substrate surfaces of a cured polyurethane and an uncured rubber compound. Upon heating, the adhesive crosslinks and the uncured rubber compound is preferably cured simultaneously. The adhesive is particularly useful in the fabrication of compositions by the bonding of cured polyurethane to an uncured rubber compound which becomes cured during the bonding process, such as in the construction of tires containing cured polyurethane reinforcements within uncured rubber carcasses, the retreading of tires containing polyurethane repairs, etc.

12 Claims, No Drawings

ADHESIVE SYSTEM FOR BONDING UNCURED RUBBER TO CURED POLYURETHANE

FIELD OF THE INVENTION

The present invention relates to an adhesive system for bonding a cured polyurethane to an uncured rubber, and to the resulting composite, where the adhesive comprises a bismaleimide and an isocyanate-terminated rubber.

BACKGROUND OF THE INVENTION

Heretofore, it was generally known to adhere or glue a cured urethane to a cured rubber compound. The use or application of a liquid urethane, that is an uncured urethane to a cured or revulcanized rubber was also known. However, it is generally not known to adhere an uncured rubber to a cured polyurethane.

U.S. Pat. No. 2,702,773 to Penn relates to bonding a rubber material to a transparent polymeric material having active hydrogen containing groups by applying a polyisocyanate type compound between the two materials before the rubber is vulcanized.

U.S. Pat. No. 2,837,458 to Coleman relates to bonding rubber to a non-metal substrate utilizing an adhesive system containing an organic isocyanate and a dithiocarbimic acid.

U.S. Pat. No. 3,264,249 to Araki et al relates to adhesive compositions utilized in medical applications containing mixtures of a compound which has a polymerizable double bond and a cyano group joining the carbon atom forming the double bond, a diene type polymer, and a polyisocyanate compound.

U.S. Pat. No. 3,264,269 to Rees et al relates to a process for crosslinking polymers containing carboxyl groups comprising reacting a diisocyanate with said polymer.

U.S. Pat. No. 3,528,848 to Zoebelein relates to a rubber article containing a hydroxylated butadiene polymer having a cured polyurethane lacquer coating.

U.S. Pat. No. 3,595,826 to Conard relates to preparing adhesives by adding dichlorobutadiene to acrylonitrile or methacrylonitrile under polymerization conditions.

U.S. Pat. No. 3,645,980 to Baker et al relates to reacting rubber with a nitrosophenol or nitrosoamine and reacting the pendant amino or hydroxyl group in the resulting product with an isocyanate.

U.S. Pat. No. 3,648,748 to Lovell relates to a cured rubber tire having adhered thereto a laminate of a cured polyurethane composite produced by coating the tire with an adhesive, cured polyurethane which is prepared by reacting an organic polyisocyanate with a reactive hydrogen-containing polymeric material.

U.S. Pat. No. 3,817,918 to Aufdermarsh relates to an elastomer-polyester composition which is adhered together through the utilization of a terpolymer of a polyisocyanate, polyhydroxyphenol, and an epoxy resin.

U.S. Pat. No. 3,832,274 to Owston relates to adhesives made from butadiene, an acrylic monomer, methacrylic acid, and the reducing component of a Redox polymerization catalyst.

U.S. Pat. No. 3,832,275 to Matvey et al relates to a composite of a vulcanized diene rubber with a low vapor transmission layer having a polyurethane outer layer suitable for use in making containers. The low vapor transmission layer can be butyl rubber.

U.S. Pat. No. 3,882,089 to Baker et al relates to the vulcanization of rubber utilizing a compound which upon heating is thought to decompose into various components including a nitroso compound, a diisocyanate, and the like.

U.S. Pat. No. 3,916,072 to Hausch et al relates to adhesive compounds containing aliphatic nitro compounds.

U.S. Pat. No. 3,917,554 to Inoue et al relates to a nitrile rubber solution type adhesive containing a butadiene-acrylonitrile alternating copolymer.

U.S. Pat. No. 3,991,255 to Blaskiewicz et al relates to the adhesion of polyurethane to an EPDM surface by chemically modifying the EPDM by mixing it with a halogen donating material.

U.S. Pat. No. 4,136,219 to Odam et al relates to adhering a urethane paint to a vulcanized rubber surface wherein the rubber surface contains a halogenated butyl rubber.

U.S. Pat. No. 4,311,181 to Hausch relates to applying an uncured urethane to a cured elastomer substrate utilizing an amine curable polymer or prepolymer such as a urethane polymer or prepolymer and a treating agent such as N-halohydantoin, a N-haloamide, or a N-haloimide.

U.S. Pat. No. 4,535,121 to Ozelli relates to an adhesive for flocking elastomers containing an isocyanate-terminated polyurethane prepolymer and an adhesion promoter which is the reaction product of an aromatic diisocyanate with a polyfunctional epoxide. Optionally, nitroso compounds can also be utilized.

U.S. Pat. No. 4,581,425 to Hefner relates to a thermosetting composition containing an alkenyl phenyl cyanate and at least one of an aromatic polyisocyanate, a polymaleimide, or a polymerizable ethylenically unsaturated aromatic monomer.

Swedish Patent No. 0648593 to Kamensvii relates to coating one surface of a cured rubber with an oligodienediisocyanate and remaining rubber surface with an aromatic diamine, combining with two surfaces and permitting crosslinking to take place.

Japanese Patent No. 136363 to Mitsubishi relates to a rubber layer, fiber layer composite, having therebetween a polyisocyanate and a hydrocarbon polymer.

Japanese Patent No. 0085941 to Ichi-kaku relates to a rubber polyurethane laminate containing a polyisocyanate and DMF.

Patent DL No. 0227388 to Schwarzheide relates to a process for bonding rubber to a foam urethane elastomer by coating the rubber with an elastic polyurethane sealant composition and pouring a urethane mixture onto the incompletely reacted coating.

Japanese Patent No. 0179251 to Gosei relates to an endless ethylene-propylene rubber composite bonded with an intermediate urethane segment.

Japanese Patent No. 0083031 to Beslon relates to a prepreg containing an epoxy resin, a reaction product of a liquid butadiene-acrylonitrile copolymer, and an epoxy resin, a diaminodiphenylsulphon, and a dicyandiamide.

Japanese Patent 0083032 to Beslon relates to an epoxy prepreg resin containing a novolak type epoxy resin, an epoxy resin containing at least one N,N-diglycidylamino group; a reaction product of (C-1) a liquid butadiene-acrylonitrile copolymer containing carboxyl groups at both ends and (C-2) an epoxy resin; 4,4'-diaminodiphenylsulphone; and dicyandiamide and a curing accelerator.

International Publication No. (PCT) 84/00552 pertains to a modified thermosetting imide resin mixture useful as a laminating resin where the resin mixture consists of a bisimide adapted to coreact upon heating with polyisocyanate.

SUMMARY OF THE INVENTION

It has now been found that a cured polyurethane elastomer can be advantageously adhered to an uncured rubber compound by utilizing a thermosetting adhesive comprising an isocyanate terminated rubber polymer and a coreactive bismaleimide. Upon heat curing, the adhesive thermosets to a crosslinked solid and tenuously adheres to both the cured polyurethane substrate and the rubber compound substrate. Preferably, the uncured rubber compound cures under heat at the same time the adhesive is cured. In practice, the adhesive composition can be applied to either the cured polyurethane substrate or the uncured rubber compound substrate, or applied to both substrates and then heat cured under pressure while joining the respective substrates to provide a strong, thermoset adhesive bond securing the substrates together to form a useful composite. Curing the uncured rubber compound simultaneously with curing the adhesive further strengthens the bond between the adhesive and the cured rubber compound. The heat curing step under pressure further provides excellent bonding between the polyurethane and rubber substrates while avoiding air gaps between the respective substrates as well as within the adhesive bond.

The adhesive composition of the present invention is particularly useful for bonding a cured polyurethane elastomeric tire carcass, or a cord or reinforcing belt within an uncured rubber tire carcass or a rubber tread where superior adhesion of the polyurethane cord or reinforcement is critical. Other uses include adhering an uncured rubber tread to a cured polyurethane tire carcass or the adhesion of a cured polyurethane tire plug to an uncured rubber compound. The adhesive can be further utilized in the fabrication of mechanical goods based on rubber/urethane laminates, the bonding of polyurethane encapsulated metal components to tires and rubber goods, and the like. These and other advantages of this invention will become more apparent by referring to the detailed description of the invention and the succeeding illustrative examples.

DETAILED DESCRIPTION OF THE INVENTION

The urethane substrate or surface which is bonded or adhered to an uncured rubber surface can generally be any conventional urethane as well as those known to the art and to the literature. For example, the polyurethane can be made from a polyether polyol or a polyester polyol which is usually reacted with a slight equivalent excess, e.g. from about 0.25 percent to about 5 percent by weight, of a polyisocyanate to form a prepolymer having terminal isocyanate groups. Generally, any type of polyisocyanate can be utilized such as those having the formula $R(NCO)_n$ where R is an aliphatic, preferably an alkyl group, an aromatic, or an aliphatic substituted aromatic such as an alkyl substituted aromatic having from 4 to 25 carbon atoms, and preferably from 8 to 18 carbon atoms. The number of isocyanate groups, that is n, can be 2, 3 or 4, but preferably is 2. Examples of specific isocyanates are well known to the art and to the literature. Preferred isocyanates include toluene diisocyanate, "MDI," that is 4,4'-methylene bis(phenylisocyanate), the various isomers of isophorone diisocyanate, and hydrogenated MDI. The polymer can then be cured with various curing agents and/or chain extenders such as various polyols or polyamines. By way of example, but not intending to be limited thereby, examples of specific types of polyurethanes which can be utilized are those as set forth in U.S. Pat. Nos. 2,620,516; 2,777,831; 2,843,568; 2,866,774; 2,900,368; 2,929,800; 2,948,691; 2,948,707; 3,114,735; and the like which are hereby fully incorporated by reference. Examples of specific types of commercially available polyurethanes include Adiprene L-367, a polytetramethylene ether glycol containing approximately 6.4 percent isocyanate end groups by weight, manufactured by Uniroyal Chemical Co.; Adiprene L-42, a polytetramethylene ether glycol containing approximately 2.8 percent isocyanate end groups by weight, manufactured by Uniroyal Chemical Co.; and Cyanaprene A-7, a polyester-based coating polymer with approximately 2.4 percent isocyanate end groups by weight, manufactured by American Cyanamid. Blends of various polyurethanes can also be utilized.

Various curing agents or chain extenders can be utilized such as polyol type curing agents and preferably amine type curing agents. Specific examples of suitable polyol curing agents include the various diols and triols containing from 2 to about 8 carbon atoms with from 3 to about 6 carbon atoms being preferred such as 1,4-butane diol, 1,3-propanediol, glycerine, trimethylol propane, and the like. Various polyamine curing agents can also be utilized with diamines being preferred. Such amine curing agents have from 2 to about 1,000 carbon atoms with specific examples including ethylenediamine, the various phenylenediamines, amine-terminated polyols, and the like. However, the following curing agents are generally preferred: MOCA, that is 4,4'-methylene bis(2-chloroaniline); or, desirably a complex of 4,4'-methylene dianiline and a salt, or a complex of racemic 2,3-di(4-aminophenyl) butane and a salt, as set forth in U.S. Pat. No. 3,755,261 to VanGulick which is hereby fully incorporated by reference. The latter two complexes are preferred. The methods for preparing the complexes are set forth in U.S. Pat. No. 3,755,261. A preferred salt utilized with the 4,4'-methylene dianiline compound is sodium chloride or lithium chloride. Due generally to availability and costs, the complexes or salts derived from 4,4'-methylene dianiline are highly preferred. Another class of amine curing agents which can be utilized are the various Versamides, that is the condensation products of polyamines and dibasic acids obtained when certain unsaturated fatty acids are polymerized, and are manufactured by Henkel Chemical Company.

Equivalent weight of the curing agent utilized with regard to the curable prepolymer or polymer, including the amine curing agent, generally ranges from about 85 percent to 115 percent with from about 95 to 105 percent being preferred.

The rubber substrate or surface of the present invention is an uncured elastomer which is made from various elastomer-forming monomers. One such class of monomers are the various conjugated dienes having from 4 to 12 carbon atoms. Specific examples of diene monomers include butadiene, isoprene, pentadiene, hexadiene, heptadiene, octadiene, 2,3-di-methyl-1,3-butadiene, 2-methyl-1,3-pentadiene, and the like. Preferred elastomers are made from monomers of butadiene and/or isoprene. Moreover, natural rubber can be utilized.

By the term "natural rubber", it is meant the elastomeric substance obtained from various trees and plants which generally grow in the tropics or desert portions of the world. Such material contains a very high content (in excess of 90 percent and often in excess of 95 percent) of cis-1,4-polyisoprene. Also included within the class of conjugated dienes are the various copolymers and interpolymers thereof, e.g., poly(butadiene-isoprene), including various diblock copolymers, various triblock copolymers, and the like.

Another class of useful elastomers are the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alphamethylstyrene, 4-t-butylstyrene, vinyl toluene, divinyl benzene, isopropenyl benzene, diisopropenyl benzene, and the like, with styrene being preferred. Examples of specific copolymers thus include poly(styrene-butadiene) (SBR), poly(alpha-methyl-styrene-butadiene), and poly(4-t-butylstyrene-butadiene). A preferred copolymer is poly(styrene-butadiene).

Although the following rubber compounds can be utilized, they are not as desired as the above elastomers. Thus, butyl rubbers can be utilized which are copolymers of isobutylene and a small amount of isoprene. Neoprene, that is polychloroprene (2-chloro-1,3-butadiene), can also be utilized. Still another class of elastomer rubbers are the nitrile rubbers, that is copolymers made from dienes as set forth above having from 4 to 12 carbon atoms with acrylonitrile monomers. Usually, the ratio of the two monomers in nitrile rubber is similar to the ratio of butadiene to styrene in styrene-butadiene rubber.

Blends of the above said rubbers can also be used. The above elastomers can be prepared according to conventional methods known to those skilled in the art as well as to the literature.

While the above description with regard to various polyurethanes and uncured elastomers or rubbers has been set forth, it is to be understood that this patent is not limited solely thereto in that the invention generally pertains to any conventional cured polyurethane and uncured rubber substrate as well as to such compounds which are known to the art and to the literature.

In accordance with this invention, the adhesive for adhering the urethane substrate to the rubber substrate comprises a thermosetting mixture of a bismaleimide compound and an isocyanate-terminated rubber polymer or copolymer. The adhesive mixture is adapted to coreact and thermoset upon heating to form a solid crosslinked adhesive bond between the cured urethane substrate and the uncured rubber substrate.

The bismaleimide compound can be generally characterized by the following formula:

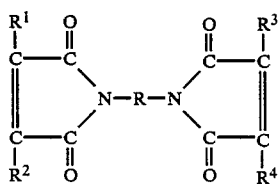

where R is an aromatic, an aliphatic, or combinations thereof, or a halogen substituent thereof. The aliphatic, especially an alkylene, has from 2 to 12 carbon atoms such as ethylene, hexylene, and the like. Aromatic compounds are preferred such as those having from 6 to 20 carbon atoms. Specific examples of aromatic groups, independently, include phenylene, biphenyl, and the like, with methylene bis(phenyl) being highly preferred. The R group can also be a low molecular weight polymer as having a molecular weight up to about 2,000, such as a hydrocarbon polymer, for example, polyethylene, or polybutadiene, a nitrogen containing polymer such as polyacrylonitrile, or an oxygen or sulfur containing polymer. $R^1$, $R^2$, $R^3$ and $R^4$, independently, is an alkyl having from 1 to 6 carbon atoms, a halogen such as fluoro or chloro, or hydrogen. When alkyl groups are utilized, they are generally straight-chained, that is they are not branched.

Alkylene-, arylene-bis-maleimides and combinations thereof are particularly useful as the crosslinking agent of the present invention. Specific bis-maleimides which are useful in the present invention include dimethylenedimaleimide, trimethylenedimaleimide, tetramethylenedimaleimide, pentamethylenedimaleimide, hexamethylenedimaleimide, heptamethylenedimaleimide, decamethylenedimaleimide; the bis-maleimides of 4,4'-methylene-bis(orthochloroaniline), 4,4'-methylenedianiline, 4,4'-methylene-bis(3-nitroaniline), 4-aminophenylether and N,N'-orthophenylenedimaleimide; N,N'-para-phenylenedimaleimide, N,N-meta-phenylenedimaleimide, N,N'-(oxydi-p-phenylene)bismaleimide, N,N'-(methylenedi-p-phenylene)bismaleimide, N,N'-(methylenedi-p-phenylene)bis(2-methylmaleimide), N,N'-(thiodi-p-phenylene(bismaleimide, N,N'-(sulfonyldi-m-phenylene)bismaleimide, polymethylene polyphenylene polymaleimides, and the like. The polymaleimides may be used either alone or in any combination. Examples of preferred bismaleimides include 4,4'-methylene-bis(orthochloroaniline), 4,4'-methylenedianiline, 4-aminophenylether, and N,N'-para-phenylenedimaleimide.

Bis-maleimides can be synthesized by various methods such as are disclosed in U.S. Pat. No. 2,444,536 and the same is incorporated expressly herein by reference. Generally, a diluted ether solution of diamine is added to a similar diluted ether solution of maleic anhydride which results in a maleamic acid. The maleamic acid can be disposed in acetic anhydride and converted into the corresponding bis-maleimide in the presence of potassium acetate. Bismaleimides typically are prepared by reacting a stoichiometric quantity of maleic anhydride relative to amine groups of a polyamine in the presence of a suitable solvent. Such polyamines can include 1,4-diaminobutane; dodecyl diamine; 1,6-hexane diamine; 2-methyl-4-ethyl-1,8-diaminooctane; methylene dianiline; diaminodiphenyl ether; and anilineformaldehyde condensation products. Preferred solvents are N,N-dimethyl-formamide, chloroform and toluene.

In use, the bismaleimides are often dispersed in an organic aprotic solvent with aromatic solvents being preferred. Such solvents do not have high boiling points, that is, the boiling points are 150° C. or less and preferably 135° C. or less. Aromatic hydrocarbon solvents and aliphatic (alkyl desired) substituted aromatic solvents are preferred such as those having from 6 to 12 carbon atoms, with from 6 to 9 carbon atoms being preferred. Examples of specific aromatic solvents include benzene, xylene, toluene, ethylbenzene, indene, anisole, mixtures thereof, and the like. Various aliphatic solvents can also be utilized having from about 5 to about 15 carbon atoms, with the various alkanes having from 6 to 9 carbon atoms being desired. Typically, the hexanes, heptanes, isooctanes, and isononanes, and mixtures thereof are desired. Various ketones having from 3 to 10 carbon atoms can also be utilized such as acetone and methyl ethyl ketone. Various esters having a total of from 2 to 15 carbon atoms can be utilized such as ethylacetate, ethyl butyrate, butyl acetate, and the like. Another class of aprotic solvents are the various polyethers, that is ethers which have two or more ether linkages therein, having from 2 to 10 carbon atoms such as ethylene glycol monobutyl ether, ethylene glycol monoethyl ether, ethylene glycol monohexyl ether, and the like. The amount of solvents utilized is generally from about 10 to about 1,000 parts by weight solvent for every 100 parts by weight of bismaleimide compound and preferably from about 15 to 150 parts by weight solvent per 100 parts by weight of bismaleimide compound.

The adhesive of this invention further contains an isocyanate-terminated rubber polymer adapted to co-react and crosslink with the bismaleimide compound. The isocyanate-terminated rubber polymer is desirably an isocyanate terminated, low molecular weight polymer made from diene or monoolefin monomers. If the polymer is produced from monoolefin monomers, the number of carbon atoms in each unit is from about 2 to about 12 carbon atoms with isobutylene being the preferred polymerized monomeric unit. When the isocyanate-terminated rubber polymer is made from dienes, any diene monomer having from 4 to 10 carbon atoms can be utilized with butadiene being the preferred polymerized unit. Copolymers made from two or more of the above monomers can also be utilized. By low molecular weight, it is meant that the polymer or copolymer has a molecular weight from about 600 to about 30,000 and preferably from about 1,000 to about 10,000.

The polyisocyanates utilized to endcap or terminate the low molecular weight rubber polymer generally have the formula $R(NCO)_n$ where n is broadly between 1.5 and 4 as an average, and is preferably 2 although small amounts of polyisocyanates can be utilized wherein n is 3 or 4. Usually the low molecular weight rubber polymer has from 1 to about 4 isocyanate groups thereon and preferably about 2 such groups. R is generally an aliphatic or preferably an alkyl having from 4 to 20 carbon atoms, with from 6 to 15 carbon atoms being preferred. Aromatic or aliphatic substituted aromatics or desirably alkyl substituted aromatics can also be utilized containing a total of from about 6 to about 25 carbon atoms, with from about 7 to about 15 carbon atoms being preferred. Specific types of suitable diisocyanates which can be utilized include the same compounds set forth hereinabove and are fully incorporated by reference. Generally, toluene diisocyanate, isophorone, and MDI are preferred.

The isocyanate-terminated rubber polymers generally are liquid and the use of solvents for dispersing the polymers is optional. If a solvent is used, essentially non-protic solvents are useful such as toluene, various lower alkane solvents, or aromatic solvents such as benzene, and similar solvents. Solvents can be utilized, if desired, at levels of about 30 to 300 weight parts solvent for every 100 weight parts of isocyanate-terminated rubber polymer.

The adhesive composition comprises on a weight basis, from about 10 percent to about 90 percent, desirably from about 20 percent to about 80 percent, and preferably from about 30 percent to about 60 percent bismaleimide based on the total weight of the bismaleimide compound and the isocyanate-terminated rubber polymer. Hence, the amount of the isocyanate-terminated rubber polymer is the difference.

The adhesive system can be prepared according to any general method by mixing the various components together either simultaneously or in any order. The adhesive system of the present invention can be added to the cured polyurethane substrate, to the uncured rubber substrate, or to both substrates, in any conventional manner as by brushing, coating, spraying, dipping, and the like. Several coats can be applied. The surface of the polyurethane substrate should be generally free of contamination. This can be accomplished by rubbing or brushing the surface thereof with a solvent such as tetrahydrofuran, acetone, methyl ethyl ketone, and the like. The surface of the rubber substrate can also be cleaned in a conventional manner such as by solvent wipe, solvent degreasing, and the like. The surfaces are allowed to dry thoroughly before and after applying the adhesive. The dried substrate surfaces containing the adhesive system of the present invention on either the rubber substrate surface, the urethane substrate surface, or both, are then brought together in contact with each other and subsequently cured. Heat is usually applied to increase the cure rate. Inasmuch as the urethanes can revert, or depolymerize, at high temperatures, the upper curing temperature range is generally 175° C. or less. Curing generally occurs at temperatures of from about 125° to about 175° C. and preferably from about 145° to about 170° C. Pressure can optionally be utilized with suitable pressure ranges being from about 50 to about 10,000 psi and preferably from about 100 to about 5,000 psi. Cure of the rubber and the adhesive desirably occur in situ.

The adhesive system of the present invention, as noted above, can be utilized in any application wherein it is desirable to bond or adhere a cured polyurethane to an uncured rubber, which is cured during the process of bonding. A composite or laminate of the rubber, the adhesive, and the urethane is thus formed. Specific examples include the adhesion of a cured urethane tire core and/or belt to an uncured rubber carcass, and/or tread, the adhesion of an uncured rubber tread to a cured polyurethane tire carcass, the adhesion of a cured urethane repair plug to an uncured rubber substrate, the fabrication of mechanical goods based on rubber/urethane laminates of this type, the bonding of polyurethane encapsulated metal components to tires and rubber mechanical goods, and the like. The uncured rubber substrate is generally and simultaneously cured with the adhesive, although it can be cured subsequently.

The invention will be better understood by reference to the following examples wherein parts are by weight and temperatures are in °C., unless otherwise indicated.

EXAMPLES

Urethane-Uncured Rubber Bonding with Bismaleimide/Polybutadiene -NCO Prepolymer Adhesive Preparation of adhesive cement "E"

A solution was made of:
200 g isocyanate-terminated polybutadiene prepolymer XMC-100 (product of Arco Chemicals); and
200 g distilled, desiccated toluene About 20.0 grams of the above was mixed vigorously for two minutes, just prior to application, with 20.0 grams of a mixture of 200 grams bismaleimide XU292 [bis(maleimidophenyl)methane, product of Ciba-Geigy Chemical Co.] and 300 grams of distilled, desiccated toluene. The resulting mixture was agitated to keep in dispersion as a brush was used to apply the adhesive mixture to the polyurethane surface.

The indicated ingredients were applied to cured polyurethane surfaces as specified. Order of application is noted in parenthesis.

TABLE I

|  | A | B | C | D | E |
|---|---|---|---|---|---|
| Chemlok 210[a] (1 coat/dry 2 hrs R.T.) | (1) | (1) | (1) | (1) | None |
| Chemlok 233[a] (1 coat/dry 1 hr. R.T.) | None | (2) | (2) | None | None |
| Chemlok 205[a] (1 coat/dry 1 hr. R.T.) | None | None | (3) | (2) | None |
| Adhesive Cement E of present invention (see previous page) (1 coat/dry 20 min 2 coat/dry 1 hr. R.T.) | None | None | None | None | (1) |
| NRTie Gum (2 layers)[b] | (2) | (3) | (4) | (3) | (2) |
| Calendered cushion stock | (3) | (4) | (5) | (4) | (3) |

Cure Conditions 320° F., 40 min., 5 Tons press. (max) @ 3" ram)
[a]Products of Lord Chemical Corporation used as adhesives for elastomer bonding.
[b]Contains natural rubber.

| | ADHESION TEST RESULTS | | |
|---|---|---|---|
| | T-Peel Force (pli) | | |
| Sample No. | 24° C. | 100° C. | Comments |
| A | 1.5, 2.5 | 1.0 | IF |
| B | 96, 142 | 2.5 | CF/Chunky Rubber Tear |
| C | 46, 40 | 7.0 | — |
| D | 5, 5 | 2.0 | Adhesive/Rubber Failure |
| E | 68, 82 | 11.5 | Mixed Chunky CF/IR |

IF = Interfacial Failure
CF = Cohesive Failure

The test results show that the adhesive of the present invention is superior to commercial adhesives for bonding cured urethane to in situ cured rubber (starting with uncured rubber), by retaining a higher strength bond at elevated temperatures, Example "E".

While in accordance with the Patent Statutes, the best mode and preferred embodiment has been set forth, the scope of the invention is not limited thereto, but rather by the scope of the attached claims.

What is claimed is:

1. An adhesive composition, comprising; a thermosetting polymeric mixture of a bismaleimide compound and an isocyanate terminated rubber polymer, said polymeric mixture comprising from about 10 percent to about 90 percent by weight of bismaleimide based upon the total weight of said bismaleimide compound and said isocyanate terminated rubber copolymer, and from about 10 percent to about 90 percent by weight of said isocyanate-terminated rubber based upon the total weight of said bismaleimide compound and said isocyanate-terminated rubber compound, wherein said rubber polymer is a low molecular weight polymer made from a monoolefin monomer having from 2 to 12 carbon atoms, a diene monomer having from about 4 to 10 carbon atoms, or combinations thereof, and containing from about 1.0 to about 4.0 terminal isocyanate groups on each said rubber polymer molecule, said terminal isocyanate groups adapted to crosslink with said bismaleimide compound upon heating, and the molecular weight of said isocyanate terminated rubber polymer being from about 600 to about 30,000.

2. An adhesive composition according to claim 1, wherein said composition optionally contains from about 10 parts to about 1,000 parts by weight of an organic aprotic solvent per 100 parts by weight of said bismaleimide compound.

3. An adhesive composition according to claim 2, wherein said bismaleimide compound has the formula:

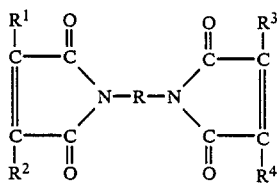

where R is an aromatic, or an aliphatic substituted aromatic having from 6 to 20 carbon atoms, or an aliphatic having from 2 to 12 carbon atoms, or a halogen derivative thereof, or a low molecular weight polymer having a molecular weight up to about 2,000, and wherein $R^1$, $R^2$, $R^3$, and $R^4$, independently, is an alkyl having from 1 to 6 carbon atoms, a halogen, or hydrogen.

4. An adhesive composition according to claim 3, wherein the amount of said bismaleimide is from about 20 percent to about 80 percent by weight and wherein the amount of said isocyanate-terminated rubber is from about 20 percent to about 80 percent by weight.

5. An adhesive composition according to claim 4, wherein said bismaleimide is dimethylenedimaleimide, trimethylenedimaleimide, tetramethylenedimaleimide, pentamethylenedimaleimide, hexamethylenedimaleimide, heptamethylenedimaleimide, decamethylenedimaleimide; the bis-maleimides of 4,4'-methylene-bis(orthochloroaniline), 4,4'-methylenedianiline, 4,4'-methylene-bis(3-nitroaniline), 4-aminophenylether and N,N'-orthophenylenedimaleimide; N,N'-paraphenylenedimaleimide, N,N-metaphenylenedimaleimide, N,N'-(oxydi-p-phenylene)bismaleimide, N,N'-(methylenedi-p-phenylene)bismaleimide, N,N'-(methylenedi-p-phenylene)bis(2-methylmaleimide), N,N'-(thiodi-p-phenylene(bismaleimide, N,N'-(sulfonyldi-m-phenylene)bismaleimide, polymethylene polyphenylene polymaleimides, or combinations thereof.

6. An adhesive composition according to claim 5, wherein said isocyanate-terminated rubber is made with an isocyanate having the formula $R(NCO)_n$ wherein n is said 1.5 to about 4.0, wherein said low molecular weight rubber polymer has from about 2 of said isocyanate groups thereon, and wherein R is an aliphatic having from 4 to 20 carbon atoms, an aromatic or an aliphatic substituted aromatic having from 6 to 25 carbon atoms, and wherein said isocyanate-terminated rubber has a molecular weight of from about 1,000 to about 10,000.

7. An adhesive composition according to claim 6, wherein said bismaleimide is 4,4'methylene-bis(orthochloroaniline), 4,4'-methylenedianiline, 4-aminophenylether, N,N'-para-phenylenedimaleimide, or combinations thereof, wherein said isocyanate portion of said isocyanate-terminated rubber is made from toluene diisocyanate, isophorone, 4,4'-methylene bis(phenylisocyanate), or combinations thereof, and wherein said rubber portion of said isocyanate-terminated rubber is made from butadiene monomers.

8. An adhesive composition according to claim 7, wherein the amount of said bismaleimide is from about 30 percent to about 60 percent by weight and wherein the amount of said isocyanate-terminated rubber is from about 40 percent to about 70 percent by weight.

9. An adhesively bonded composite, comprising; a cured polyurethane substrate and a previously uncured rubber substrate bonded together with the adhesive composition of claim 1.

10. An adhesively bonded composite, comprising; a cured polyurethane substrate and an uncured rubber compound substrate bonded together with the adhesive composition in claim 3.

11. The adhesively bonded composite, comprising; a cured polyurethane substrate and an uncured rubber compound substrate bonded together with the adhesive composition in claim 5, and wherein said uncured rubber substrate is cured during crosslinking of said bismaleimide compound and said isocyanate-terminated rubber.

12. The adhesively bonded composite, comprising; a cured polyurethane substrate and an uncured rubber compound substrate bonded together with the adhesive composition in claim 7, and wherein said uncured rubber substrate is cured during crosslinking of said bismaleimide compound and said isocyanate-terminated rubber.

* * * * *